H. SCOTT.
TRAP.
APPLICATION FILED MAY 25, 1910.
986,088.
Patented Mar. 7, 1911.
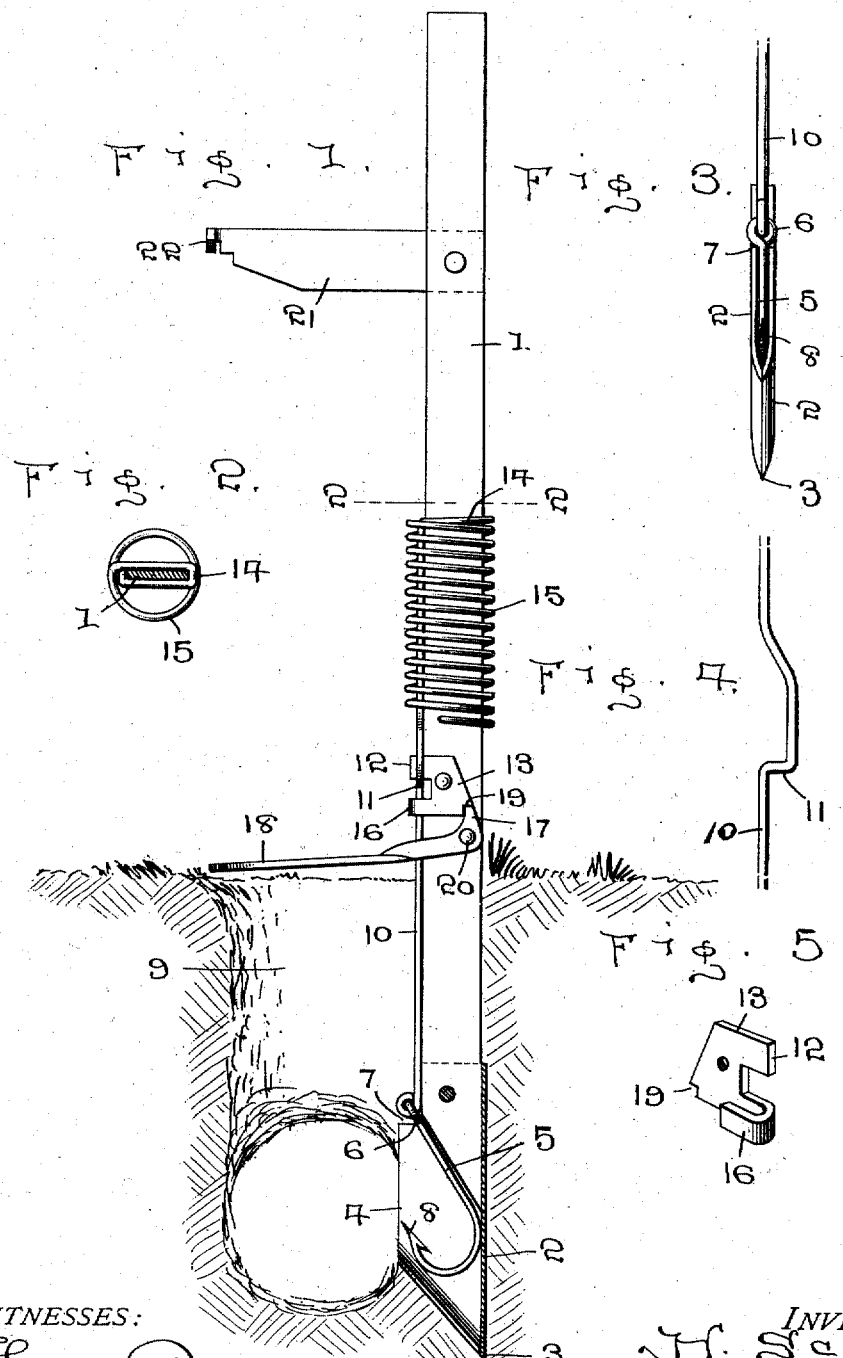

UNITED STATES PATENT OFFICE.

HENRY SCOTT, OF ELK CREEK, NEBRASKA.

TRAP.

986,088.  Specification of Letters Patent.  Patented Mar. 7, 1911.

Application filed May 25, 1910. Serial No. 563,318.

*To all whom it may concern:*

Be it known that I, HENRY SCOTT, a citizen of the United States, residing at Elk Creek, in the county of Johnson and State of Nebraska, have invented certain new and useful Improvements in Traps; and I do hereby declare the following to be a full, clear, and exact description of the invention, such as will enable others skilled in the art to which it appertains to make and use the same.

My invention relates to new and useful improvements in traps and more particularly to that class adapted to be used for catching gophers, prairie dogs and such other animals as burrow in the ground and my object is to provide an impaling hook and means for drawing the same into engagement with the animal.

A further object is to provide a trigger which will hold the trap in its set position.

A further object is to provide means for holding the hook operating mechanism against action while the trigger is being set, and, a further object is to provide a housing for the hook when the trap is in its set position.

Other objects and advantages will be hereinafter referred to and more particularly pointed out in the specification and claims.

In the accompanying drawings which are made a part of this application, Figure 1 is a side elevation of the trap in its set position showing the housing for the hook in section. Fig. 2 is a sectional view as seen on line 2—2 Fig. 1. Fig. 3 is an edge elevation of the lower end of the trap. Fig. 4 is a detail elevation of a portion of the hook actuating rod, and, Fig. 5 is a detail perspective view of the trigger latch employed for holding the trap in its set position.

Referring to the drawings in which similar reference numerals designate corresponding parts throughout the several views, 1 indicates a standard, which preferably consists of a flat piece of metal, to the lower end of which is secured a housing 2, said housing being formed from a section of sheet metal doubled upon itself, the lower end of the housing being tapered from its forward to its rear edge to provide a point 3, so that the housing and lower end of the standard may be readily introduced into the earth's surface.

The forward edge 4 of the housing is left open so that a hook 5 may be entered therein, said hook being constructed in any suitable manner, but preferably comprising a large size fish hook and the capacity of the housing 2 is such as to inclose the hook with the exception of the eye 6 at the upper end thereof, which eye projects into an offset 7 in the housing.

The lower end of the standard 1 is tapered substantially at the same angle as the lower end of the housing so that when the hook is drawn out of the housing, the pointed end 8 thereof will be swung outwardly and caused to enter the body of the animal, as it attempts to leave the opening 9 leading to its den or nest.

Attached to the eye 6 of the hook is a rod 10, which extends upwardly and parallel with one edge of the standard 1, said rod in its length being bent at right angles to form a shoulder 11, with which engages one arm 12 of a trigger latch 13, said latch being pivotally secured to one face of the standard. The upper end of the rod 10 terminates in a loop 14, which surrounds the standard 1 and said loop terminates in a coil spring 15, said spring being extended downwardly from the loop and around the standard and integral end of the rod, the lower end of the spring being fixed to the standard. The lower portion of the rod 10 is held in alinement by forming a hook 16 on the latch 13 and below the arm 12, the rod 10 passing through said hook, while the shoulder 11 is positioned between the arm and hook when the trap is set.

The coil spring 15 is contracted when the hook is positioned within the housing, this operation moving the shoulder 11 against the hook 16, which will result in rotating the latch and extending the arm 12 over the shoulder. A finger 17 on a trigger 18 is then engaged with a notch 19 at the lower rear edge of the latch 13, said trigger being pivoted to the standard 1 at a point below the latch and when the finger is in engagement with the notch in the latch, said finger will be substantially immediately above the pivotal point 20 of the trigger, so that the weight of the trigger proper will be sufficient to normally hold the finger in engagement with the latch.

In order to guard against the trap being accidentally sprung while the trigger is being set, a guard 21 is pivotally secured to the standard 1 at a point above the spring, the free end of the guard having a right angled extension 22 thereon, which passes above the end of the spring when in its contracted position, thus preventing the expansion of the spring until such time as the guard is again swung upwardly.

In applying the trap to use, the spring 15 is depressed until the hook 5 is seated within the housing, when the guard 21 is swung downwardly and the extension 22 disposed over the upper end of the spring. The pointed end of the housing is then entered in the opening leading to the den of the animal and forced into the soil at the side of the opening a sufficient distance to anchor the standard or until the trigger rests, when in its set position, substantially flush with the upper end of the opening. The trigger is then moved downwardly until the finger engages the notch in the latch, when the guard 21 is again swung upwardly, thus directing the pressure of the spring against the arm and on to the trigger. The standard 1 is placed adjacent one side of the opening through which the animal passes, so that the animal can readily pass through the opening in leaving its den and by positioning the trigger immediately over the mouth of the opening, the pressure directed against the trigger by the animal in its endeavor to leave the opening will move the trigger upwardly and release the finger from the latch, whereupon the spring will expand and draw the hook upwardly and into the body of the animal, thus impaling the animal upon the hook.

The pointed end of the hook is preferably provided with a barb similar to a fish hook to prevent the hook from being released.

All the parts of this device are formed of metal, thereby rendering the same very strong and durable and it will be seen that the trap can be manufactured at a very nominal cost. It will further be seen that by properly setting the trap, it will be impossible for the animal to leave the opening without springing the trap and it will likewise be seen that as the hook leaves the housing, the pointed end thereof will be swung outwardly so as to positively engage the animal as the hook travels upwardly.

What I claim is:—

1. In a trap, the combination with a standard, of a rod terminating at one end in a spring, the lower end of the spring being attached to the standard, a hook at the lower end of said rod adapted to be moved into engagement with an animal by the spring and means to hold the spring contracted until released by the animal.

2. In a trap, the combination with a standard and a housing at the lower end of said standard, of a hook, a rod to which said hook is engaged, a spring attached to the standard and adapted to move said rod and hook upwardly and means to hold said spring contracted and the hook seated in the housing when desired.

3. In a trap, the combination with a standard and a housing fixed to the lower end of said standard, said housing being open at one edge, of a spring surrounding the standard and having one of its ends fixed thereto, the opposite end of the spring terminating in a depending rod, a hook connected to the free end of said rod and a trigger mechanism adapted to hold the spring contracted and the hook seated in the housing until the trigger mechanism is released.

4. In a trap, the combination with a standard and a housing at the lower end of said standard, the lower ends of the housing and standard being tapered, of a rod having a shoulder in its length, the upper end of said rod terminating in a coil spring, one end of the spring being secured to the standard, a hook at the lower end of said rod and adapted to be seated in said housing, a latch having an arm adapted to engage said shoulder and hold the spring in its contracted position and a trigger adapted to engage the latch and retain the same in engagement with the shoulder until the trigger is elevated.

5. In a trap, the combination with a standard, of a rod having a shoulder in its length, a latch adapted to engage said shoulder, a trigger adapted to hold the latch in engagement with the shoulder until the trigger is released, said latch having means thereon for retaining said rod in alinement with said standard, an impaling device carried by the lower end of the rod and means to raise said rod and operate the impaling device.

6. In a trap, the combination with a standard, a spring surrounding said standard and having one end secured thereto, the opposite end of said spring terminating in a rod, said rod being provided in its length with a shoulder, a latch pivoted to said standard below said spring, means to force said spring downwardly to allow said latch to engage said shoulder, an impaling device secured to the lower end of said rod, and a trigger adapted to hold the latch in engagement with the shoulder until said trigger is elevated.

In testimony whereof I have signed my name to this specification in the presence of two subscribing witnesses.

HENRY SCOTT.

Witnesses:
ROY L. HOKE,
FRANK KOPP.